United States Patent [19]

Lin

[11] 3,919,284
[45] Nov. 11, 1975

[54] PROCESS FOR MAKING 2-CYANO-2-HYDROXYIMINOACETAMIDE SALTS
[75] Inventor: Kang Lin, Newark, Del.
[73] Assignee: E. I. Du Pont de Nemours & Company, Wilmington, Del.
[22] Filed: June 13, 1974
[21] Appl. No.: 478,965

[52] U.S. Cl. ......... 260/465.4; 260/464; 260/465 D; 260/940; 424/304
[51] Int. Cl.² ..................................... C07C 120/00
[58] Field of Search ............................. 260/465.4

[56] References Cited
UNITED STATES PATENTS
3,625,987  12/1971  Hubele .................. 260/465.4 X
3,642,957  2/1972  Billet ........................ 260/940
3,780,085  12/1973  Engelhart .................. 260/465.4

OTHER PUBLICATIONS

Miller et al., J.A.C.S., 74 (1952), 2892–2894.

Conrad et al. et al., Ber. 42 (1909), 735–742.

Primary Examiner—Joseph Paul Brust

[57] ABSTRACT

Salts of 2-cyano-2-hydroxyiminoacetamides are produced by the reaction of a nitrite salt and 2-cyanoacetamide in the presence of less than a stoichiometric amount of acid.

7 Claims, No Drawings

PROCESS FOR MAKING 2-CYANO-2-HYDROXYIMINOACETAMIDE SALTS

BACKGROUND OF THE INVENTION

This invention is a process for producing 2-cyano-2-hydroxyiminoacetamide salts. These compounds are known as valuable fungicides and as intermediates in the production of other valuable fungicides. These fungicides are described in the patent literature. See German Offenlegungsschrift No. 2,312,956, published September 20, 1973.

One method of making 2-cyano-2-hydroxyiminoacetamide is taught in Berichte 42, 738 (1909). Cyano-acetamide is reacted with sodium nitrite and acetic acid. Similar reactions are taught in *J. Chem. Soc.*, 1959, 4042, Friedlander 10, 1177, and U.S. Pat. No. 3,625,987. These reactions require the use of an amount of acid equal to or greater than the amount of sodium nitrite used. However, in order to convert the free oxime product of this reaction to the salt form, all of the acid added during the reaction must be neutralized. Thus, an additional step is added and disposal of the neutralized acid waste is necessary. Further, use of large amounts of strong acids sometimes causes decomposition of the 2-cyano-2-hydroxy-iminoacetamide.

The production of 2-cyano-2-hydroxyiminoacetylurea in the absence of acid is taught in Berichte 42, 740 (1909). Cyanoacetylurea reacts with sodium nitrite in the presence of boiling water. However, for 1-cyanoacetyl-3-alkylurea, this process produces a low yield of the sodium hydroxyimino compound because it causes cyclization. [See Berichte 41, 537 (1908).]

It has now been found that the problems of low yield, cyclization of the product and waste disposal of the neutralized acid can be avoided by using less than a stoichiometric amount of acid in the reaction between nitrites and 2-cyanoacetamides. This discovery permits the reaction to be conducted at low temperatures at which cyclization does not occur. 2-Cyano-2-hydroxyiminoacetamide salts are obtained in high yields. Decomposition of the product due to low pH's is avoided and the necessity for separation and disposal of large amounts of neutralized acid is removed. Subsequent alkylation or acylation of the 2-cyano-2-hydroxyiminoacetamide salt, if desired, can be conducted without isolation of the intermediate product.

SUMMARY OF THE INVENTION

2-Cyano-2-hydroxyiminoacetamide salts of the formula

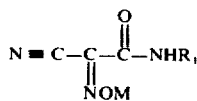

where
M is sodium, potassium or lithium
$R_1$ is hydrogen,

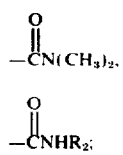

and
$R_2$ is hydrogen, alkyl of 1 to 4 carbon atoms or allyl are made by the process of this invention.

A 2-cyanoacetamide of the formula

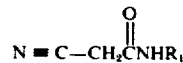

is reacted with a nitrite salt of the formula
$MNO_2$
where M and $R_1$ are defined as above. The reaction is conducted at a temperature of from 10° to 80°C. in an aqueous solvent which is 5 to 100 percent by weight water and 0 to 95 percent by weight water-miscible organic solvent.

The nitrite salt may be used in slight excess, the ratio of 2-cyanoacetamide to nitrite being from 1:1 to 1:1.1. The reaction is conducted with a less than stoichmetric amount of acid, from one tenth to one half mole of acid per mole of nitrite.

DESCRIPTION OF THE PREFERRED EMBODIMENTS

Of the nitrite salts useful in the process of this invention, sodium nitrite is preferred because of its economy. Reaction temperatures of 30° to 60°C. are preferred and the preferred solvent is an aqueous solution that is at least 50 percent by weight water and the remainder methanol. In order to prevent side reactions of the nitrous acid generated during the process, exclusion of oxygen from the process is preferred.

The product of the reaction between a 2-cyanoacetamide, a nitrate salt and less than a stoichiometric amount of acid is a mixture of the free oxime form and the salt of 2-cyano-2-hydroxyiminoacetamide. As used herein, the term "acid" refers to any proton donating compound. These include mineral acids, organic acids, proton liberating organic compounds such as the free oxime of 2-cyano-2-hydroxyiminoacetamides and ion exchange resins. The free oxime in the mixture can be converted to the salt form by adjusting the pH to 7–9 with an appropriate base such as sodium hydroxide. Similarly, the salt can be converted to the free oxime by acidification of the mixture to pH 2. These reactions are illustrated below.

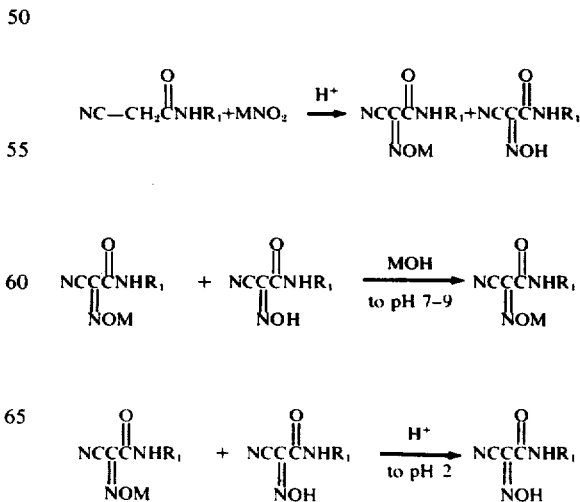

The free oximes precipitate and can be isolated by filtration from aqueous reaction media. The oxime salts can be isolated if desired by crystallization from aqueous media.

The starting materials used in the process of this invention are commercially available or easily synthesized. Cyanoacetamide is commercially available. Compounds where

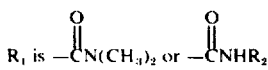

can be synthesized by reacting cyanoacetic acid with an appropriately substituted urea in the presence of a dehydrating agent such as acetic anhydride.

As stated above, the 2-cyano-2-hydroxyiminoacetamides made by the process of this invention are useful as agricultural fungicides, or are useful as intermediates for agricultural fungicides. An example of a fungicide made by the process of this invention s 2-hydroxyiminoacetamide, sodium salt. An example of a fungicide which requires additional reactions beyond the process claimed herein is 2-cyano-2-methoxyimino-N-ethylaminocarbonylacetamide, a compound wherein

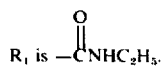

Substituents on the oxime group can be added by conventional reactions. Salts of 2-cyano-2-hydroxyiminoacetamides can be made by slurrying the free oxime in water, adding an equivalent amount of the appropriate base and warming the mixture until all the solids go into solution. The desired salts can then be recovered by crystallization. Relatively insoluble salts such as the zinc and manganese salts can be made by adding an equivalent amount of the appropriate heavy metal salt to an aqueous solution of a soluble compound such as the sodium salt of 2-cyano-2-hydroxyiminoacetamide. The sodium ion will be replaced by the heavy metal ion and the insoluble compound will precipitate. Some of the salts of 2-cyano-2-hydroxyiminoacetamide are obtained in the form of hydrates. The water of hydration can be removed by drying. The alkali salts also form a 1:1 complex with 2-cyano-2-hydroxyiminoacetamide.

The salts of 2-cyano-2-hydroxyiminoacetamide formed by the process of this invention undergo alkylation or acylation without isolation from the reaction mixture. Conventional alkylating and acylating agents can be used. For example, methylation can be carried out by adjusting the pH of the reaction mixture containing the sodium salt of 2-cyano-2-hydroxyiminoacetamide to 7–9, and controlling the temperature at 10°–80°C. One to one and one half equivalents of dimethyl sulfate is added, together with sodium hydroxide to maintain the pH at 7–9. The product is isolated by cooling the mixture, filtering, washing and drying the precipitated material.

The fungicides made by the process of this invention and the additional reactions subsequent to the production of the 2-cyano-2-hydroxyiminoacetamide salt necessary to produce other fungicides are described in German Offenlegungsschrift No. 2,312,956 and U.S. application Ser. No. 453,392.

The following examples further illustrate the process of this invention.

EXAMPLE 1

To 151 parts of 1-cyanoacetyl-3-ethylurea and 72 parts of sodium nitrite in 250 parts of methanol and 250 parts of water, blanketed with nitrogen at 40°C, was added with stirring over 1 hour 37 parts of 6N HCl. The solution was stirred at 40°C for 2 hours. The solution, having a pH of 5.3, contained 2-cyano-2-hydroxyimino-N-ethylaminocarbonylacetamide in the forms of free oxime and its sodium salt. To the above solution at 40°C was added 0.4 g of Aerosol OTB, followed by the addition of ~64 parts of concentrated HCl to adjust the pH of the medium from 5.3 to 2.0. The slurry was cooled to 5°C and filtered. After drying, it gave 176 parts of 2-cyano-2-hydroxyimino-N-ethylaminocarbonylacetamide, m.p. 208 dec.

EXAMPLE 2

To the solution of 2-cyano-2-hydroxyimino-N-ethylaminocarbonylacetamide in the forms of free oxime and its sodium salt at 40°C obtained as described in Example 1, was added ~15.1 parts of 50% NaOH to adjust the pH of the medium from 5.3 to 7–8. To this was added 147 parts of dimethyl sulfate (DMS) while the temperature was kept at 40°C and the pH maintained at 7–8 by adding more 50 percent caustic. After the addition of the DMS, the pH was maintained at 7–8 for another 1 hour. The slurry was cooled to 5°C. After filtration and drying of the product, 159 parts of 2-cyano-2-methoxyimino-N-ethylaminocarbonylacetamide, m.p. 163°–165°C were recovered.

By using the method described above, compounds of the following structures can be prepared similarly:

$$R_2-N-\underset{H}{C}-N-\underset{H}{C}-\underset{\parallel}{C}-CN$$
$$\phantom{xxxxxx}\overset{\parallel}{O}\phantom{xx}\overset{\parallel}{O}\phantom{x}\underset{N-OR}{\parallel}$$

| $R_2$ | R = | M.P. |
|---|---|---|
| $C_2H_5$ | $C_2H_5$ | 121–2° |
| $C_2H_5$ | n—$C_3H_7$ | 104–5° |
| $C_2H_5$ | i—$C_3H_7$ | 102–3° |
| $C_2H_5$ | n—$C_6H_{13}$ | 80.5–2° |
| allyl | $CH_3$ | 134–6° |
| n—$C_3H_7$ | $CH_3$ | 121.5–3° |
| i—$C_3H_7$ | $CH_3$ | 137.5–8.5° |
| n—$C_4H_9$ | $CH_3$ | 98–100° |
| sec—$C_4H_9$ | $CH_3$ | 72–3° |
| iso—$C_4H_9$ | $CH_3$ | 108–9° |
| H | —$CH_2$—$CH_3$ | 156.5–7° |
| H | —$CH(CH_3)_2$ | 148–150° |
| H | —$(CH_2)_5$—$CH_3$ | 96–99° |
| H |  | 178–80° |
| H | —$(CH_2)_{11}$—$CH_3$ | 81–4° |
| H | —$CH_2$—$CH_2$—$CH_2$—CN | 153–6° |
| H | —$CH_2$—CH=$CH_2$ | 120–1° |
| H | 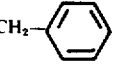 | 152–3° |
| H | 10 —$CH_2$—$CH_2$—O— | 94–6° |

-continued

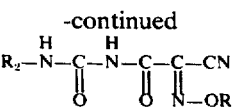

| $R_2$ | R = | | M.P. |
|---|---|---|---|
| H | —CH₂—CH₂—O—C₆H₅ | —Br | 134–6° |
| H | —C(O)—CH₂—CH₃ | | 169–70° |
| H | cyclopentyl | | — |
| H | cycloheptyl | | — | and $$H_2N-\underset{\underset{O}{\|}}{C}-\underset{\underset{N-OR}{\|}}{C}-CN$$

| R = | M.P. |
|---|---|
| C₂H₅ | 123–5° |
| n—C₃H₇ | 105–7° |
| i—C₃H₇ | 90–2° |
| n—C₄H₉ | 89–90° |
| n—C₅H₁₁ | 87–9° |
| n—C₆H₁₃ | 88–90° |
| cyclohexyl | 146–8° |
| 2—ethyl hexyl | 47–9° |
| n—C₇H₁₅ | 79.5–80.5° |
| n—C₈H₁₇ | 84–6° |
| n—C₉H₁₉ | 86–7° |
|  | 86–7° |
| n—C₁₀H₂₁ |  |
| n—C₁₁H₂₃ | 83–4° |
| n—C₁₃H₂₇ | 86.7° |

Substituted alkyl derivatives or alkenyl derivatives are made in the same way. The following table lists a number of such materials by way of example.

$$H_2N-\underset{\underset{O}{\|}}{C}-\underset{\underset{N-O-R}{\|}}{C}-CN$$

| R = | M.P. |
|---|---|
| —CH₂—CH₂—C₆H₅ | 88–9° |
| —CH₂—CH₂—CH₂—CN | 77–80° |
| —CH₂—COOC₂H₅ | 143.5–44° |
| —CH(CH₃)—C(O)—CH₃ | 120–1° |
| —CH₂—CH₂—O—C(O)—CH₃ | 90–1° |
| —CH(CH₃)—C₆H₅ | 146–7° |
| —CH₂—CH=CH₂ | 78–9° |
| —CH₂—CH₂—OH | 124–5° |
| —CH₂—C₆H₄(o-CN) | 180–1° |

-continued

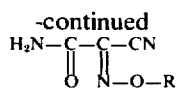

| R = | M.P. |
|---|---|
| —CH₂—C₆H₄—Br | 165–5.5° |
| —CH₂—C₆H₄—F | 106–7° |
| —CH₂—C(O)—C₆H₅ | 188–9.5° |
| —CH₂—C(O)—C₆H₄—Cl | 187–188.5° |
| —(CH₂)₃—O—C₆H₅ | 98–100° |
| —(CH₂)₂—O—C₆H₄—Br | 139–141° |
| —P(=S)(OC₂H₅)₂ | 110–1° |
| —C(O)—CH₃ | 143–5° |
| —C(O)—C₆H₅ | 222–3° |
| —P(=S)(OCH₃)₂ | — |
| —CH₂—CH₂—O—C(O)—CH₂—CH₂—CH₃ | — |
| (CH₂)₂COC₃H₇ | — |
| CH₂—C(O)—CH₃ | — |
| CH(CH₃)—C(O)—(CH₂)₂—CH₃ | — |
| —C(O)—H | — |
| (CH₂)₁₂CN | — |
| —CH₂—C₆H₅ | — |

-continued $H_2N-\underset{\underset{O}{\|}}{C}-\underset{\underset{N-O-R}{\|}}{C}-CN$

| R = | M.P. |
|---|---|
| 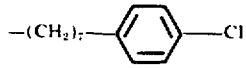 | — |
| 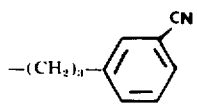 | — |
| 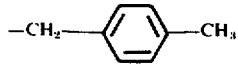 | — |
| 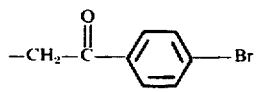 | — |
| 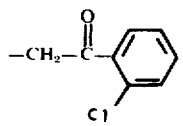 | — |
| 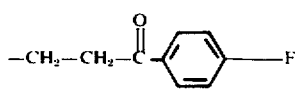 | — |
| 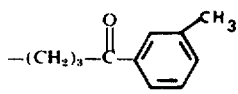 | — |
| 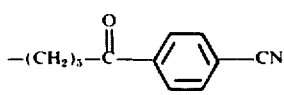 | — |
| 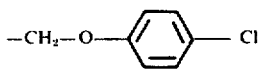 | — |
| 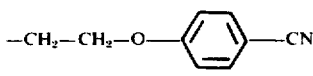 | — |
| 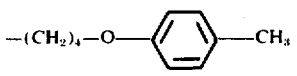 | — |
| 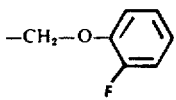 | — |

-continued $H_2N-\underset{\underset{O}{\|}}{C}-\underset{\underset{N-O-R}{\|}}{C}-CN$

| R = | M.P. |
|---|---|
| 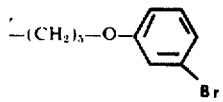 | — |
| 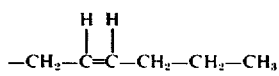 | — |
| 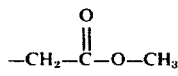 | — |
| —(CH$_2$)$_3$OH | — |
| 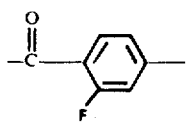 | — |
| 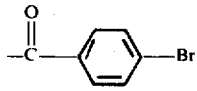 | — |
| 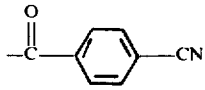 | — |
| 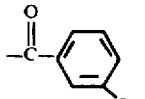 | — |

EXAMPLE 3

To a solution of 420 parts of 2-cyanoacetamide and 363 parts of sodium nitrite in 700 parts of water at 50°C were added over 2 hours 27.5 parts of 6N HCl. Another 440 parts of 6N HCl was added over 2 additional hours. The reaction was held at 50°C for 2 hours. At the end of reaction the pH of the medium was between 4 and 5. The reaction mixture contained an 2-cyano-2-hydroxyiminoacetamide in the forms of free oxime and its sodium salt.

To the above solution at 10°–25°C was added 279 parts of concentrated HCl until a pH of 2 was reached. The solution was cooled to 0°–5°C and filtered. After drying, 504 parts of 2-cyano-2-hydroxyiminoacetamide, m.p. 179°–181°C were recovered.

EXAMPLE 4

To the solution containing 2-cyano-2-hydroxyiminoacetamide in the forms of the free oxime and its sodium salt at pH between 4 and 5 of Example 3 was added 100 parts of 50% NaOH to adjust the pH to 7.8. The suspension was cooled to 30°C, seeded with the tetrahydrate form of 2-cyano-2-hydroxyiminoacetamide crystals. The suspension was cooled further to 5°C to give after filtration 1035 parts of the tetrahydrate of 2-cyano-2-hydroxyiminoacetamide, sodium salt, m.p. >300°C., which was dried in a vacuum oven to give 674 parts of 2-cyano-2-hydroxyiminoacetamide, sodium salt, m.p. >300°C.

EXAMPLE 5

To 42 parts of 2-cyanoacetamide and 35 parts of sodium nitrite in 150 parts of water at 50°C under $N_2$ was added 15 parts of Amberlite IRC 84 $H^+$ exchange resin. This resin is a weak cation exchange resin containing a carboxylic acid functionality. The pKa of the resin is about 5.3. The reaction was held at 50°C. for 5 hours. The solution contains the yield of 2-cyano-2-hydroxyiminoacetamide in the forms of free oxime and its sodium salt was about 90 percent as evidenced by ultraviolet and liquid chromatographic analyses.

I claim:

1. A process for preparing a 2-cyano-2-hydroxyiminoacetamide salt of the formula

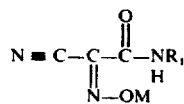

wherein
M is sodium, lithium, or potassium;
$R_1$ is hydrogen,

or

$R_2$ is hydrogen, alkyl of 1 to 4 carbon atoms or allyl, comprising contacting a nitrite of the formula $MNO_2$ with a 2-cyanoacetamide of the formula

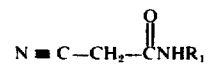

in the presence of a proton donating acid and an aqueous solvent at a temperature of from 10° to 80°C, the mole ratio of 2-cyanoacetamide to nitrite being from 1:1 to 1:1.1, the mole ratio of nitrite to acid being from 1:0.1 to 1:0.5 and the aqueous solvent being from 5 to 100 percent by weight water and from 0 to 95 percent by weight water miscible organic solvent.

2. The process of claim 1 wherein the temperature is from 30° to 60°C.

3. The process of claim 1 wherein oxygen is excluded from the reaction mixture.

4. The process of claim 1 wherein the aqueous solvent is 50 to 100 percent by weight water and 0 to 50 percent by weight methanol.

5. The process of claim 1 wherein M is sodium.

6. The process of claim 5 wherein $R_1$ is hydrogen.

7. The process of claim 5 wherein $R_1$ is

* * * * *